May 28, 1940.  R. S. JACOBSEN  2,202,384
VARIABLE SPEED TRANSMISSION
Original Filed June 4, 1936
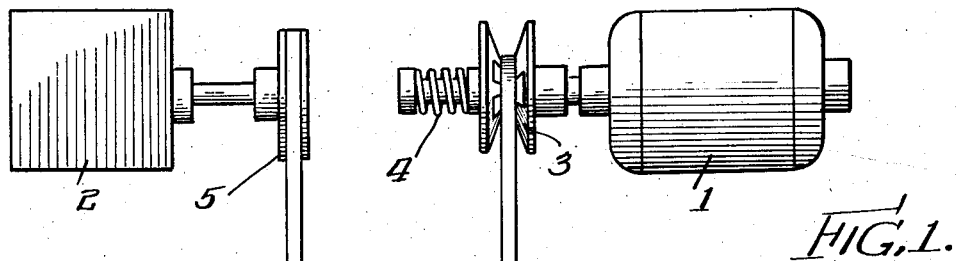
FIG. 1.
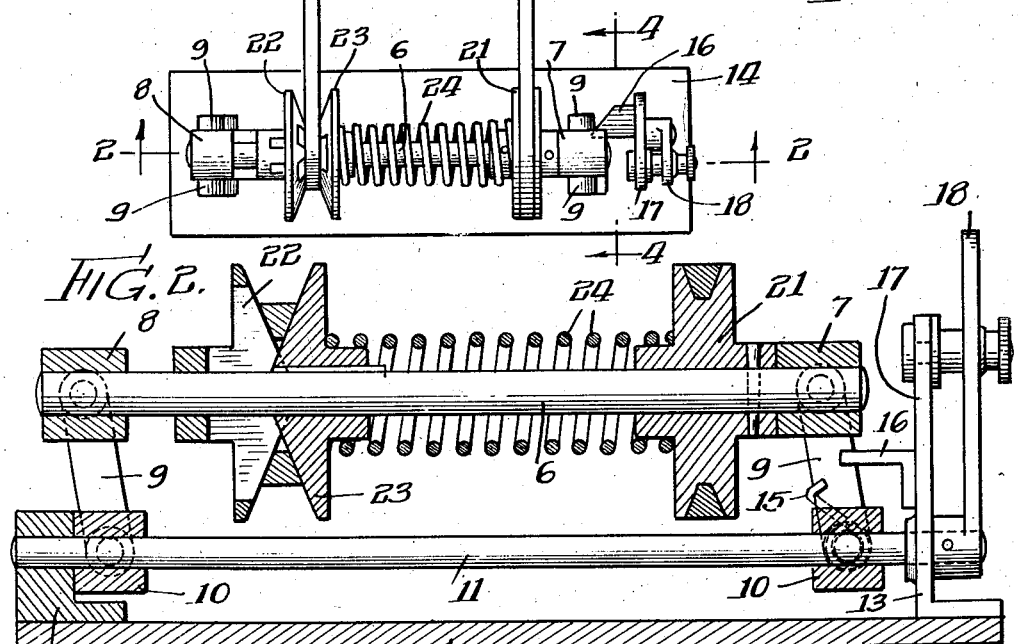
FIG. 2.
FIG. 3.   FIG. 4.
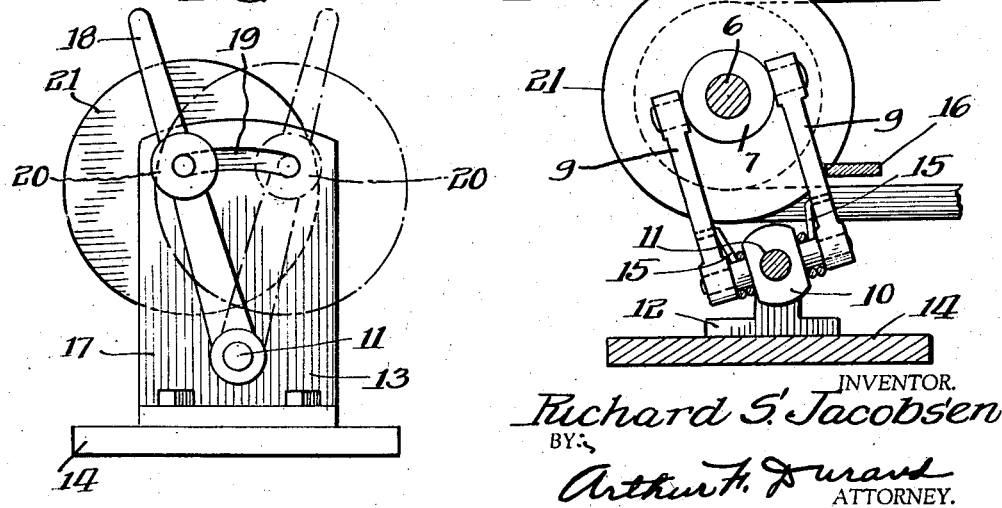
INVENTOR.
Richard S. Jacobsen
BY
Arthur F. Durand
ATTORNEY.

Patented May 28, 1940

2,202,384

UNITED STATES PATENT OFFICE 2,202,384

VARIABLE SPEED TRANSMISSION

Richard S. Jacobsen, Wheaton, Ill., assignor to Reeves Pulley Company, Columbus, Ind., a corporation of Indiana Original application June 4, 1936, Serial No. 83,409. Divided and this application August 10, 1938, Serial No. 224,006

18 Claims. (Cl. 74—230.17)

This invention relates to variable speed power transmission devices, and more especially to those that employ laterally expansible V-pulleys and belts, so that the pulley in effect has its diameter changed or varied to change the speed of transmission.

Generally stated, the object of the invention is to provide a novel and improved construction and arrangement whereby any suitable machine is operated by a motor through the medium of a counter-shaft, with only a single expansible pulley on the counter-shaft, the other pulley on the latter being fixed, in combination with means for moving the counter-shaft laterally and endwise as well, thereby to not only change the speed of transmission, but also to maintain the belts parallel.

It is also an object to provide certain details and novel features of construction and combinations tending to increase the general efficiency and the desirability of a variable speed power transmission of this particular character.

To the foregoing and other useful ends, the invention consists in matters hereinafter set forth and claimed and shown in the accompanying drawing, in which—

Fig. 1 is a plan of a variable speed power transmission between a motor and a machine, through the medium of a counter-shaft, embodying the principles of the invention.

Fig. 2 is an enlarged vertical longitudinal section on line 2—2 in Fig. 1 of the drawing.

Fig. 3 is an enlarged end elevation on the line 3—3 in Fig. 1 of the drawing.

Fig. 4 is an enlarged transverse section on line 4—4 in Fig. 1 of the drawing.

As thus illustrated, the invention comprises a motor 1 and a machine 2 to be driven thereby. The spindle or shaft of said motor has a laterally expansible V-pulley 3 mounted thereon, with the movable section thereof subject to the pressure of the coil spring 4, which latter tends to contract the pulley. The machine 2 may be of any suitable or desired character and has its shaft or spindle provided with a fixed pulley 5 of any suitable character.

The counter-shaft 6 is mounted to rotate in bearings 7 and 8, which are in turn mounted on the upper ends of links 9 that have their lower ends pivoted or swivelled on the sleeves 10 that are made fast to the horizontal rock shaft 11, which latter is adapted to be rocked in the bearings 12 and 13, fixed on the base 14, as shown in the drawing. A spring 15 is applied to the links adjacent the bearing 7, to urge the counter-shaft 6 endwise in one direction, but the fixed cam 16, mounted on the bracket 17, engaging one of the links 9, tends to urge the counter-shaft endwise in the opposite direction, when the said shaft is moved laterally by rocking the said rock shaft. For this purpose, the said rock shaft is provided with a handle 18 fixed in one end of the rock shaft, and the bracket 17 is provided with a segment slot 19 for the screw device 20, carried by the handle, so that the latter can be set in any adjusted position thereof.

It will be seen that the V-pulley 21 is nonexpansible and is fixed on the said counter-shaft. The other pulley 22 has a movable section 23 that is splined on the said counter-shaft, so that these two sections can be moved toward or away from each other, thereby in effect to change the diameter of the pulley. A coil spring 24 is interposed between the pulley 21 and the section 23, so that the latter is normally urged by the spring toward the fixed section of this pulley.

Thus, the counter-shaft 6 is adapted to move endwise about a plurality of axes at right angles thereto, which axes are provided by the pivots at the upper and lower ends of the links 9, and the said counter-shaft is also adapted to move in the arc of a circle, the axis of which is coincident with the axis of the rock shaft 11, so that said counter-shaft has a lateral arcuate path of displacement when moved back and forth by the handle 18, and also has some endwise movement because of the engagement of the cam 16 with one of the links 9, in the manner shown and described. The lateral movement of the shaft 6 in one direction tends to expand the pulleys 3, and 22 and 23, laterally, thus in effect reducing the diameter of these two pulleys, and changing the speed of transmission accordingly. When the counter-shaft 6 is moved in the opposite direction, the two expansible pulleys are permitted to contract, under the urging of the springs 4 and 24, thus again changing the speed of transmission. Obviously, therefore, any speed may be had between the two positions shown for the handle 18 in Fig. 3 of the drawing.

Any suitable means can be provided for preventing endwise displacement of the counter-shaft 6 in the bearings 7 and 8, and these bearings must move axially with the shaft, when the latter is moved forward and back laterally thereof. Obviously, with this arrangement, when the counter-shaft 6 moves away from the motor driven or power input shaft, there must be some endwise displacement of this countershaft to the left, in order to keep the belts parallel and to maintain pulley alignment. Similarly, when the counter-shaft 6 moves toward the said input shaft, the counter-shaft must then be displaced endwise to the right, in order to keep the belts parallel and maintain pulley alignment. Thus the belt that is shown connecting the counter-shaft to the output shaft driving the machine to be operated is maintained in a fixed vertical plane. The belt that is shown connecting the said power input shaft to the counter-shaft is always parallel with the other belt, but this belt that is driven by the motor, it will be seen, has lateral displacement bodily, to maintain pulley alignment as between the motor shaft and the counter-shaf. Thus the spring 15 and the cam 16 must be applied accordingly, so that the counter-shaft will have the endwise displacement, relative to the input and output shafts, in the manner shown and described.

Thus, a very simple set-up is provided, involving expansible V-pulleys and V-belts, for changing the speed of transmission, and the cost of construction and installment is comparatively low.

What I claim as my invention is:

1. A variable speed drive comprising a motor having a spindle, a first V-pulley of variable diameter on said spindle having a coned disc fixed on said spindle, a mating disc axially shiftable with respect thereto, and means resiliently urging said mating disc toward said fixed disc, an output shaft, a fixed-diameter pulley secured thereto, a countershaft, means supporting said countershaft parallel to said motor spindle and output shaft for movement away from both motor spindle and output shaft or toward both motor spindle and output shaft, a second fixed-diameter pulley secured to said countershaft opposite said V-pulley, a V-belt providing a driving connection between said V-pulley and said second fixed-diameter pulley, a second V-pulley of variable diameter mounted on said countershaft opposite aid first fixed-diameter pulley and having a coned disc fixed to said countershaft, a mating disc axially shiftable with respect thereto, and means resiliently urging said mating disc toward said fixed disc, a V-belt providing a driving connection between said first fixed-diameter pulley and said second V-pulley, said supporting means including a base, a carrier rotatably mounting said countershaft, means on said base guiding said carrier whereby the axis of said countershaft is moved simultaneously transversely and parallel to the axes of said motor spindle and said output shaft to maintain belt alignment during relative axial movement between said belts and the fixed discs consequent upon radial movement of said belts over the coned faces of said fixed discs and to change the speed ratio, and means cooperating with said base for actuating said carrier.

2. A variable speed drive comprising a motor having a spindle, a first V-pulley of variable diameter on said spindle having a coned disc fixed on said spindle, a mating disc axially shiftable with respect thereto, and means resiliently urging said mating disc toward said fixed disc, an output shaft aligned with said motor spindle, a second V-pulley of fixed diameter secured thereto, a countershaft, means supporting said countershaft parallel to said motor spindle and output shaft, a third V-pulley of fixed diameter secured to said countershaft opposite said first V-pulley, a V-belt providing a driving connection between said first and third pulleys, a fourth V-pulley of variable diameter mounted on said countershaft opposite said second pulley and having a coned disc fixed to said countershaft, a mating disc axially shiftable with respect thereto and means resiliently urging said last-mentioned mating disc toward said fixed disc, a V-belt providing a driving connection between said second and fourth pulleys, said supporting means including a base, a carrier rotatably mounting said countershaft, means on said base guiding said carrier whereby the axis of the countershaft is moved simultaneously transversely and parallel to the axes of said motor spindle and said output shaft to maintain belt alignment during relative axial movement between said belts and the fixed discs consequent upon movement thereof over the coned faces of said fixed discs and to change the speed ratio, and means cooperating with said base for actuating said carrier.

3. A variable speed drive comprising a motor having a spindle, a first V-pulley of variable diameter on said spindle having a coned disc fixed on said spindle, a mating disc slidably keyed on said spindle and means resiliently urging the mating disc towards said fixed disc, an output shaft aligned with said motor spindle, a second V-pulley of fixed diameter secured thereto, a countershaft, means supporting the latter parallel to said motor spindle and output shaft, a third V-pulley of fixed diameter secured to said countershaft opposite said first pulley, a V-belt connecting said first and third pulleys, a fourth V-pulley of variable diameter mounted on said countershaft opposite said second pulley and having a coned disc fixed to said countershaft, a mating disc slidably keyed to said countershaft and means resiliently urging said last mentioned mating disc towards the fixed disc, a V-belt connecting said second and fourth pulleys, said supporting means including a base, a carrier rotatably mounting said countershaft, means on said base guiding said carrier whereby the axis of the countershaft is moved simultaneously transversely and parallel to the axes of said motor spindle and said output shaft to maintain belt alignment during relative axial movement between said belts and the fixed discs consequent upon movement thereof over the coned faces of said fixed discs and to change the speed ratio, and means cooperating with said base for actuating said carrier.

4. A structure as specified in claim 1, in which said carrier comprises a rock shaft upon which said countershaft is mounted to shift endwise.

5. A structure as specified in claim 1, in which said carrier comprises a link supporting the countershaft and a cam engaging said link to shift the countershaft endwise.

6. A structure as specified in claim 1, in which said carrier comprises a rock shaft with bearings on said base, links pivotally supported on said rock shaft, and pivots on the upper ends of said links to support said countershaft.

7. A structure as specified in claim 1, in which said carrier comprises a rock shaft and a handle for manually rocking the same to shift said countershaft laterally.

8. A structure as specified in claim 1, in which said guiding means comprises a spring urging said countershaft endwise in one direction, and a cam urging the countershaft endwise in the opposite direction.

9. In a variable speed transmission, the combination of a power input shaft, an output shaft, a sectional pulley of variable effective diameter on the input shaft, a pulley of fixed diameter on the output shaft, a countershaft parallel with said other shafts, the latter being at one and the same side of said countershaft, a sectional pulley of variable effective diameter on the countershaft, a pulley of fixed diameter on the countershaft, a belt connecting the first mentioned sectional pulley with said last mentioned fixed diameter pulley, a belt connecting said other two pulleys, and mechanism for moving said countershaft toward and away from said other shafts, to change the effective diameters of the two sectional pulleys, having provisions for displacing said countershaft endwise relative to said other shafts to keep said belts parallel and maintain pulley alignment.

10. A structure as specified in claim 9, having a compression spring on the input shaft for the first mentioned sectional pulley, and a similar spring on the countershaft for said other sectional pulley.

11. A structure as specified in claim 9, the input and output shafts being axially aligned.

12. Variable speed drive means comprising an input shaft having a pulley thereon, an output shaft having a pulley thereon, two V-belts traveling respectively about said input-shaft pulley and said output-shaft pulley, a countershaft substantially parallel with said input and output shafts, two pulleys mounted on said countershaft, said belts traveling respectively over said last-named pulleys, two of the four recited pulleys consisting of relatively shiftable pairs of mating coned discs and at least one of said discs being axially fixed, and means for simultaneously increasing the center distances between said countershaft on the one hand and said input and output shafts on the other hand, and for simultaneously decreasing such center distances.

13. Variable speed drive means comprising an input shaft having a pulley thereon, an output shaft having a pulley thereon, two V-belts traveling respectively about said input-shaft pulley and said output-shaft pulley, a countershaft substantially parallel with said input and output shafts, two pulleys mounted on said countershaft, said belts traveling respectively over said last-named pulleys, two of the four recited pulleys being resiliently expansible, and means for simultaneously increasing the center distances between said countershaft on the one hand and said input and output shafts on the other hand, and for simultaneously decreasing such center distances, while positively shifting axially certain pulley elements including at least one non-expansible pulley to maintain proper alignment of both of said belts during either type of variation of such center distances.

14. Variable speed drive means comprising a supported input pulley, a supported output pulley, one of said pulleys consisting of a pair of mating coned discs relatively axially movable to vary the effective diameter thereof, a supported third pulley, a V-belt traveling over said input pulley and said third pulley, a supported fourth pulley, means for driving said fourth pulley from said third pulley, a V-belt traveling over said fourth pulley and said output pulley, one of said third and fourth pulleys consisting of a pair of mating coned discs relatively axially movable, and means for simultaneously increasing or simultaneously decreasing the center distances between the pulleys joined by said belts, at least one of said discs being axially fixed.

15. Variable speed drive means comprising a supported input pulley, a supported output pulley, one of said pulleys consisting of a pair of mating coned discs relatively axially movable to vary the effective diameter thereof, a supported third pulley, a V-belt traveling over said input pulley and said third pulley, a supported fourth pulley, means for driving said fourth pulley from said third pulley, a V-belt traveling over said fourth pulley and said output pulley, one of said third and fourth pulleys consisting of a pair of mating coned discs relatively axially movable, and means for simultaneously increasing or simultaneously decreasing the center distances between the pulleys joined by said belts, while maintaining alignment of said respective belts, at least one of said discs being axially fixed.

16. Variable speed drive means comprising a supported input pulley, a supported output pulley, one only of said pulleys consisting of a pair of mating coned discs relatively axially movable to vary the effective diameter thereof, two further supported pulleys, one only of said last-named pulleys consisting of a pair of mating coned discs relatively axially movable to vary the effective diameter thereof, means providing a driving connection between said last-named pulleys, belts connecting the first-mentioned expansible pulley with the second-mentioned non-expansible pulley and connecting the first-mentioned non-expansible pulley with the second-mentioned expansible pulley, and means for simultaneously increasing or simultaneously decreasing the center distance between the pulleys joined by said belts to vary the effective diameters of said expansible pulleys, at least one of said discs being axially fixed.

17. Variable speed drive means comprising an input shaft, a variable-diameter pulley mounted thereon, an output shaft, a constant-diameter pulley mounted thereon, a countershaft, a constant-diameter pulley mounted on said countershaft, a belt providing a driving connection between said variable-diameter pulley and the constant-diameter pulley on said countershaft, a variable-diameter pulley mounted on said countershaft, a belt providing a driving connection between the variable-diameter pulley on said countershaft and the constant-diameter pulley on said output shaft, and means for moving said countershaft toward said input and output shafts or away from said input and output shafts while simultaneously shifting said countershaft axially.

18. Variable speed drive means comprising an input shaft, an output shaft, a first variable-diameter pulley on one of said shafts, a first constant-diameter pulley on the other of said shafts, a countershaft, a second variable-diameter pulley on said countershaft, a second constant-diameter pulley on said countershaft, a belt providing a driving connection between said first constant-diameter pulley and said second variable-diameter pulley, a belt providing a driving connection between said first variable-diameter pulley and said constant-diameter pulley, and means for shifting said countershaft toward said input and output shafts or away from said input and output shafts while simultaneously shifting said countershaft axially.

RICHARD S. JACOBSEN.